Oct. 27, 1959
T. C. FLAVIN
2,910,435
CONTROLLING THE B.T.U. CONTENT OF RESIDUE GAS
FROM A HYDROCARBON SEPARATION SYSTEM
Filed Dec. 20, 1954
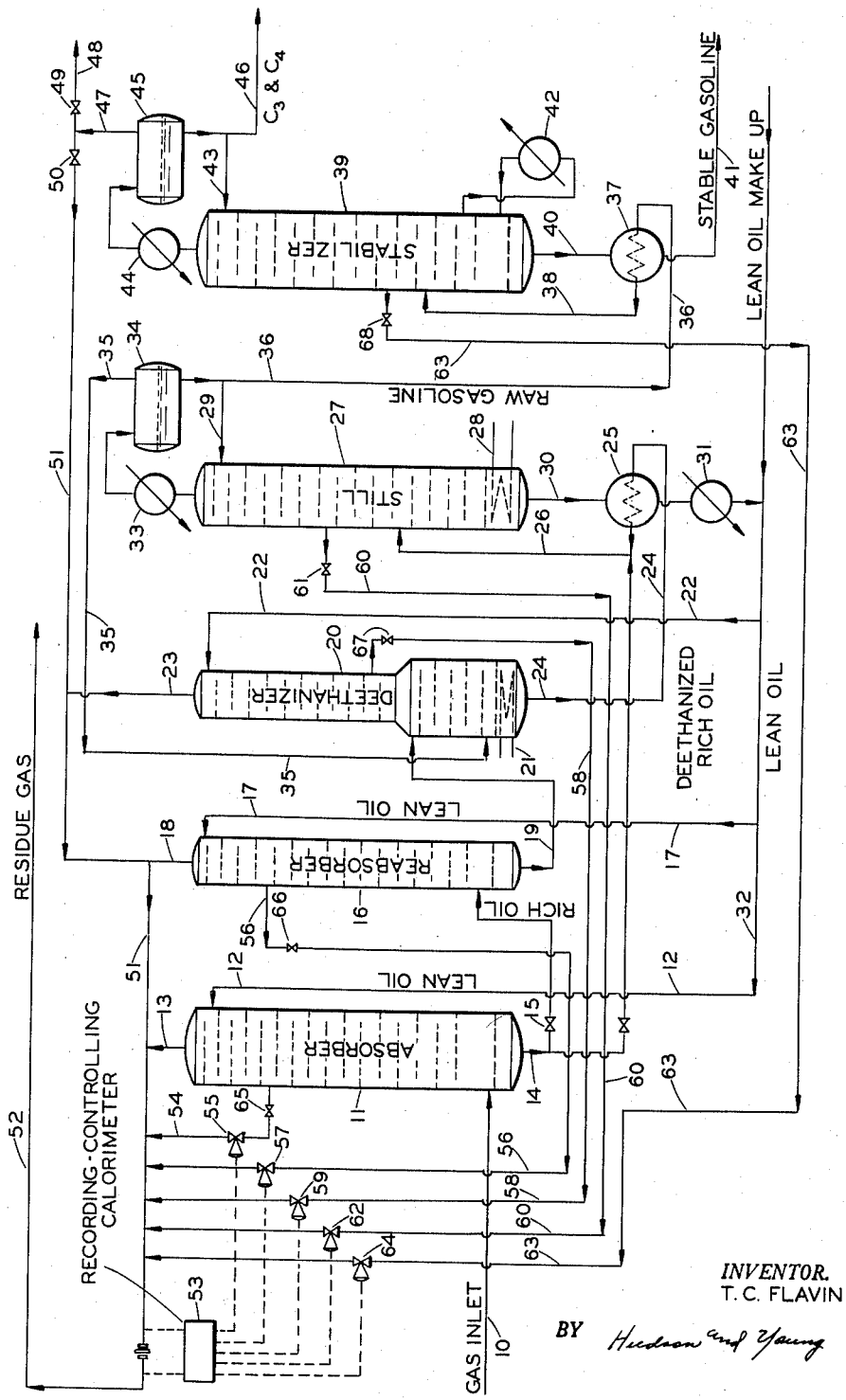
INVENTOR.
T. C. FLAVIN
BY Hudson and Young
ATTORNEY United States Patent Office 2,910,435
Patented Oct. 27, 1959

2,910,435

CONTROLLING THE B.T.U. CONTENT OF RESIDUE GAS FROM A HYDROCARBON SEPARATION SYSTEM

Thomas C. Flavin, Bartlesville, Okla., assignor to Phillips Petroleum Company, a corporation of Delaware Application December 20, 1954, Serial No. 476,271

9 Claims. (Cl. 208—344)

This invention relates to the treatment of hydrocarbons. In one aspect this invention relates to producing a residue gas having a predetermined heating value. In another aspect this invention relates to enriching a residue gas with the least expensive gas available. In another aspect this invention relates to enriching a residue gas with a vapor stream, richer in normal butane but poorer in isobutane and propane, withdrawn from a preselected region of a hydrocarbon separation zone.

In the operation of a natural gas processing system for the extraction of natural gasoline and liquefiable petroleum gas fractions it is common practice to recover a gaseous residue as a product of the system for use as a heating medium. It is well known that in the operation of such a system the residue gas produced is subject to wide variation in the heating value. These variations require, when the residue gas is to be used as a heating medium and particularly when said gas is sold to a pipe line system, a continuously operating system for maintaining the heating value of the residue gas substantially constant. Variations in heating value of a residue gas are generally due to two causes, (1) the presence of non-combustible gases such as nitrogen and carbon dioxide in the gas being treated and (2) changes in operating variables of the extraction or separation system. Most commonly the variations in the heating value of such a residue gas are such as to require an increase in its heating value, which is usually accomplished by blending a gaseous stream of higher heating value with the residue gas. This process is commonly called gas enrichment.

Various methods for enriching and maintaining the heating value of a gas are known to the prior art. Generally speaking these methods comprise enriching the gas with the lowest molecular weight gaseous hydrocarbon available. For example, when a residue gas, comprising largely methane, produced from an absorber or a stabilizer in a natural gas processing system is to be enriched, it is common practice to change the operating conditions on the absorber, the stabilizer, or another separation unit of the system in order to drive more of the lower boiling hydrocarbons such as ethane, propane and isobutane overhead from said absorber or stabilizer and thus enrich the residue gas. Such hydrocarbon separation systems are generally operated primarily to recover these more valuable liquefiable petroleum gases, particularly propane and isobutane, and the natural gasoline content in the natural gas, and operating conditions are set accordingly. The disadvantages of changing operating conditions merely to maintain the heating value of the residue gas, generally a product of lesser importance, are readily apparent.

In past years before the increase in value of the liquefiable hydrocarbon gases and natural gasoline, such methods have, in general, worked well enough. However, in recent years the development of new processes utilizing the said hydrocarbons as raw materials has increased their value to such a point that their recovery and utilization, other than as a component of residue gas has become very important. For example, ethane is used to produce ethylene which is the starting material for the synthesis of a wide variety of chemical products, such as ethylene oxide, ethylene glycol, etc. The demand for propane as a raw material and as LPG fuel is ever increasing. Isobutane has long been more valuable than normal butane. Thus, while in the past it has been the practice to control and/or maintain the heating value of a residue gas above a predetermined minimum, using the lowest molecular weight hydrocarbons available, it is now desirable to control the heating value of said residue gas with respect to a maximum value as well as a minimum value. Furthermore, it is highly desirable to use the least expensive gas available for the enriching of the residue gas.

I have found that appreciable monetary savings as well as important operating advantages can be realized by enriching the residue gas from a hydrocarbon separation system or process with an intermediate or higher molecular weight hydrocarbon, as opposed to using the lowest molecular weight hydrocarbon available. For example, when a stream richer in normal butane, but poorer in propane and isobutane, is used as the enriching gas, important monetary savings are realized due to the lesser value of the normal butane as compared with the value of propane and isobutane. Further, when operating according to my invention, i.e., withdrawing the enriching gas from a preselected intermediate region of a separation zone in the separation system, it is unnecessary to change operating conditions on the various units of the system as described above, in order to cause more of the higher heating value hydrocarbons to be driven overhead into the residue gas. By thus eliminating the necessity for changing operating conditions in order to maintain the heating value of the residue gas the system can be operated to maximum advantage, i.e., for the separation and recovery of the more valuable hydrocarbons.

An object of my invention is to provide a process for treating hydrocarbons.

Another object of my invention is to provide an improved process for the separation and recovery of natural gasoline, liquefiable petroleum gas fractions, and residue gas from natural gas streams.

Another object of my invention is to provide a method for enriching a residue gas.

Another object of my invention is to provide a method for enriching a residue gas with the least valuable gas available.

Still another object of my invention is to provide a method for enriching a residue gas with a vapor stream withdrawn from an intermediate point of a hydrocarbon separation system.

Still another object of my invention is to provide a method for controlling and/or maintaining the heating value of a residue gas substantially constant at a predetermined value.

Still a further object of my invention is to provide apparatus by means of which the foregoing objects can be accomplished.

Other objects and advantages of my invention will be apparent from that which follows.

Thus, according to the invention, there is provided a method for maintaining the heating value of a residue gas which comprises enriching said residue gas with a vapor stream withdrawn from an intermediate point of a hydrocarbon separation zone.

Further according to the invention there is provided a method for controlling and/or maintaining the heating value of a residue gas produced from a mixture of hydrocarbons in a hydrocarbon separation system which comprises: withdrawing a residual gas from said system; enriching said residual gas with a vapor stream withdrawn from an intermediate region of a separation zone of said system to form said residue gas; measuring the heating value of said residue gas; and varying the rate of withdrawal of said vapor stream responsive to said measurement.

It is to be noted that the vapor stream employed as an enriching medium is withdrawn from an intermediate point of a hydrocarbon separation zone. For example, in such a separation zone comprising an absorber, a distillation column, a stabilizer, an extractive distillation column, etc., such a vapor stream would be commonly called a side stream. By thus withdrawing said vapor stream from an intermediate point of a separation zone employed to separate hydrocarbon mixtures comprising $C_1$ to $C_5$ plus hydrocarbons, it is possible to select a point at which the ratio of the concentration of normal butane to the concentration of propane and isobutane is highest.

It is also to be noted that control and maintenance of the heating value of the residue gas is completely separated or divorced from control of the various separation zones of the hydrocarbon separation system. Thus the method of my invention makes it possible to set the operating conditions for the maximum recovery of the more valuable hydrocarbons and operate the system substantially without regard to maintaining the heating value of the residue gas. This is possible because the enriching stream can be withdrawn from any intermediate point in a separation zone at which point the concentration of the least expensive gas is highest.

Also, according to the invention, there is provided apparatus for controlling and/or maintaining the heating value of a residue gas substantialy constant at a predetermined value which comprises a controlling calorimeter in combination with means for withdrawing a vapor stream from a mid-point of a separation zone in a hydrocarbon separation system.

The attached drawing illustrates diagrammatically one form of apparatus which can be employed to carry out the several methods of my invention.

Referring now to the drawing the invention will be more fully explained. A stream of natural gas comprising $C_1$ to $C_5$ plus hydrocarbons is introduced through line 10 into absorber 11 wherein it is contacted countercurrently with a stream of lean oil introduced through line 12, residual gas is withdrawn through line 13 and treated further as described hereinafter. Rich oil containing absorbed hydrocarbons is withdrawn from absorber 11 through line 14, valve 15, and is introduced into the bottom portion of reabsorber 16, wherein the lowest boiling hydrocarbons are flash vaporized from said rich oil. Flashed hydrocarbons are contacted countercurrently in reabsorber 16 with a stream of lean oil introduced into the upper portion of said reabsorber through line 17. A residual gas is withdrawn through line 18 and treated further as described hereinafter. Patially denuded rich oil is withdrawn from the bottom of said reabsorber through line 19, and introduced into deethanizer 20. Heat introduced into the bottom portion of said deethanizer from a source not shown by means of reboiler coil 21 causes vaporization of the lower boiling hydrocarbons which pass upwardly through said deethanizer and are contacted countercurrently with a stream of lean oil introduced into the top portion of deethanizer 20 through line 22. A residual gas largely methane and ethane is withdrawn through line 23 and treated further as described hereinafter.

Deethanized rich oil is withdrawn from deethanizer 20 through line 24, passed through heat exchanger 25, line 26 and introduced into still 27. In still 27 heat is introduced by means of reboiler coil 28 and reflux is supplied through the top of said still 27 through line 29 so as to maintain distillation conditions within said still in order to remove absorbed hydrocarbons from the absorption medium. Stripped absorption medium is withdrawn from said still through line 30, heat exchanger 25, cooler 31, and passed into line 32. Said stripped absorption medium comprises the lean oil passed through lines 12, 17, and 22 as described above. Overhead vapors from still 27 are partially condensed in condenser 33 and passed into accumulator 34 from which uncondensed vapors are withdrawn through line 35 and introduced into the lower portion of deethanizer 20 for use as stripping gas in said deethanizer. A portion of the raw gasoline from accumulator 34 is returned to still 27 through line 29 for reflux as previously described. The remainder of said raw gasoline is withdrawn through line 36, heat exchanger 37, line 38 and introduced into stabilizer 39. In stabilizer 39 said raw gasoline is stabilized by distilling therefrom $C_4$, $C_3$ and lighter hydrocarbons. A stable gasoline comprising $C_5$ and higher boiling hydrocarbons is withdrawn through line 40, heat exchanger 37 and passed through line 41 to storage or other use as desired. Distillation conditions are maintained in stabilizer 39 by reboiling a portion of the liquid from the lower portion of said stabilizer in reboiler 42. Overhead vapors from stabilizer 39 are partially condensed in condenser 44 and passed into accumulator 45. A portion of the condensate, comprising $C_3$ and $C_4$ hydrocarbons, is withdrawn from accumulator 45 and passed through line 46 to storage or other use as desired. Uncondensed vapors from accumulator 45 are withdrawn through line 47. Said accumulator vapors can be passed through valve 49 and line 48 to a vapor recovery plant, if such plant is available, or other use as desired. In some instances, such as when the extraction plant above described is in a relatively isolated field location a vapor recovery plant will not be available. In such instances the reflux accumulator vapors are usually passed through valve 50, line 51, and combined with the residual gases from lines 13, 18, and 23 to form a combined residual gas from the system. Said combined residual gas is then passed through line 52 to pipe line sales or other use.

Frequently, as discussed above, the heating value of the combined residual gas in line 51 is too low to meet pipe line minimum specification requirements. In such instances it has been common practice in the past to enrich said residual gas by changing the operating conditions on one of the separation units such as the absorber, the reabsorber, the deethanizer, the stripipng still, or the stabilizer, so as to cause higher boiling hydrocarbons to pass overhead from said separation zones into line 51 and thereby enrich and increase the heating value of the residue gas. As pointed out above, this method of operation possesses many disadvantages because of the constant necessity for varying operating conditions on one or more of the separation units of the system.

When operating according to my invention a vapor stream is withdrawn from an intermediate point of one of the said separation units, is combined with the residual gases in line 51, and the heating value of the combined stream is determined in recording calorimeter 53, which controls the withdrawal rate of said vapor stream responsive to said heating value measurement. For example, a vapor stream can be withdrawn from an intermediate point of absorber 11 through line 54, valve 65, and valve 55, and combined with the gases in line 51. A sample of the combined gas in line 51 is passed into calorimeter 53 and the heating value of the combined stream is measured. Calorimeter 53, being operatively connected to valve 55, controls the rate of withdrawal of said vapor stream responsive to said measurement. Similarly, a vapor stream can be withdrawn from an intermediate point of reabsorber 16 through line 56, valve 66 and valve 57; from deethanizer 20 through line 58, valve 67, and valve 59; from still 27 through line 60, valve 61 and valve 62; or from stabilizer 39 through line 63, valve 68 and valve 64. Each of said withdrawn vapor streams can be combined with the gases in line 51, the heating value of the combined stream determined, and the rate of withdrawal of said stream controlled in the manner described in connection with the withdrawal of the vapor stream through line 54 from absorber 11, since calorimeter 33 is also operatively connected to valves 57, 59, 62 and 64. However, since pentanes are presently much too valuable to be used for enriching purposes, the withdrawal of a vapor stream from still 27 through line 60, as stated above, is presently the least preferred method of operation. Generally, the enriching vapor is withdrawn from only one of the separation zones at a time, i.e., only one of the valves 65, 66, 67, 61 and 68 is open at one time. However, there may be times when it would be desirable to withdraw enriching vapor from more than one separation zone simultaneously.

Controlling calorimeter 53 is of a conventional type and its construction and operation are well known to those skilled in the art. If desired a detailed description of such a calorimeter can be found in Patent 2,547,970, issued April 10, 1951, to W. L. Phillips et al.

Table I below shows vapor concentration gradients in a stabilizer tower employed in a system such as that illustrated in the drawing. According to the invention the enriching gas is withdrawn from an intermediate point of the separation zone where the ratio of the least valuable hydrocarbon is highest. Presently normal butane is less valuable than isobutane or propane. Thus, in a system being employed for maximum propane recovery from a mixture of hydrocarbons comprising $C_1$ to $C_5$ plus hydrocarbons it would be desirable to select the intermediate withdrawal point at a point where the ratio of normal butane to propane is highest. Since the boiling point of isobutane is intermediate those of propane and normal butane, the ratio of isobutane in the vapor will also be low at the point where the ratio of normal butane to propane is highest.

Thus, herein and in the claims the phrase "richer in normal butane and poorer in propane" or the term "richer in normal butane and poorer in isobutane and propane" refers to the ratio of the said hydrocarbons in the withdrawn vapors relative to the ratio of said hydrocarbons in a vapor stream withdrawn from some other point in the separation zone.

TABLE I

*Concentration gradients of normal butane and propane vapors in a stabilizer tower*

| Tray: | Ratio of mol percent n-$C_4$ and $C_3$ |
|---|---|
| 9 | 30.5/64.5 |
| 10 | 24.5/71.0 |
| 11 | 19.0/76.5 |
| 12 | 13.6/81.5 |
| 13 | 9.3/85.1 |
| 14 | 6.0/87.6 |
| 15 | 4.0/90.0 |
| 16 | 2.6/91.0 |
| 17 | 1.8/90.5 |
| 18 | 1.6/87.5 |
| 19 | 1.0/76.0 |
| 20 | 0.5/60.5 |

In the above Table I concentration gradients are shown only from the ninth tray upward in the tower. This is because below the ninth tray pentanes are present in the tray vapors in increasing amounts. Pentanes are much too valuable to be used for enriching purposes.

The following example further illustrates the invention:

EXAMPLE

A residue gas from a hydrocarbon separation system is enriched from 920 B.t.u. per 1000 cubic feet to 950 B.t.u. per 1000 cubic feet, and also to 1000 B.t.u. per 1000 cubic feet, by withdrawing a vapor stream from the ninth tray of the raw gasoline stabilizer in said system. Table II given below summarizes the data for said enrichment and shows a comparison with values for enriching said gas with the vapor stream from the reflux accumulator of said stabilizer. Said stabilizer is a 20 tray column operating with a top tower temperature of 145–150° F., a kettle temperature of 265° F. and a 3:1 reflux ratio.

TABLE II

*Comparison between enriching a residue gas with vapors from an intermediate point and with overhead vapors of a stabilizer*

| | 9th tray vapors | | Vapors from stabilizer tower reflux accumulator | |
|---|---|---|---|---|
| | Enriching to 950 B.t.u. | Enriching to 1,000 B.t.u. | Enriching to 950 B.t.u. | Enriching to 1,000 B.t.u. |
| Ratio $C_4/C_3$ | 30.5/64.5 | Same | 2.5/40 | Same |
| Ratio $C_i/C_2$ | 7/1 | Same | 45/1 | Same |
| Percent $C_3$ and $C_4$ | 95 | Same | 42.5 | Same |
| Percent $C_1$ and $C_2$ | 5 | Same | 57.5 | Same |
| Vapor required: | | | | |
| Cu. ft./1,000 cu. ft. residue gas | 18 | 47 | 38 | 102 |
| $C_4$ in vapor, cu. ft | 5.3 | 14.3 | 1.0 | 2.5 |
| $C_3$ in vapor, cu. ft | 11.8 | 30.4 | 15.1 | 40.8 |

A comparison of the values given in Table II definitely shows that when the residue gas is enriched with vapors from the ninth tray the amount of propane used is much less than when the residue gas is enriched with vapors from the reflux accumulator. For example, when enriching 920 B.t.u. gas to 950 B.t.u. gas only 18 cubic feet of ninth tray vapors are required, compared to 38 cubic feet of reflux accumulator vapors per 1000 cubic feet of residue gas. It should be noted that the amount of propane in the ninth tray vapors is much less than the amount in the reflux accumulator vapors. By using ninth tray vapors instead of reflux accumulator vapors the amount of propane used for enrichment is approximately 22 percent less.

Obviously, while the enriching vapors are withdrawn from the ninth tray of the stabilizer in the above example, in some other separation zone it may be desirable to withdraw the enriching vapors from the eighth tray, the tenth tray or some other intermediate tray, depending upon the point at which the ratio of the least expensive gas is highest.

A further advantage to be noted is that, in normal operation for maximum recovery of propane the amount of vapors from the reflux accumulator needed for enrichment would not be available without changing operating conditions on the stabilizer, either by supplying less reflux to said stabilizer or operating the overhead condenser at a higher temperature. By withdrawing the enriching vapors from an intermediate point, such as the ninth tray, control and maintenance of the residue gas heating value is substantially completely divorced from the stabilizer controls, and operating conditions on said stabilizer and the remainder of the system can be set for maximum propane recovery.

Those skilled in the art will immediately appreciate that the system herein disclosed is capable of variation in its details without departure from the subject matter of the combinations herein described. As an example, the pressure fluid motor operated valves could be replaced by electrical motor actuated valves.

Auxiliary apparatus such as valves, pumps, and the detailed construction of towers, pressure regulators, etc. are not shown for purposes of simplicity, since the construction and operation of such apparatus are well known.

Those skilled in the art will recognize that the process flow of a hydrocarbon separation system such as that illustrated in the drawing is capable of being modified in many ways. For example, reabsorber 16 can take, as feed thereto, vent gases from other sources in the plant which are rich in desirable components. For example, the vapors from accumulator 45 could be introduced into reabsorber 16. In such instances the rich oil from absorber 11 could also be introduced into reabsorber 16 as shown or could be passed directly to deethanizer 20, with reabsorber 16 being employed to treat the vent gases from accumulator 45 and/or other sources in the plant.

In a simplified plant reabsorber 16 and/or deethanizer 20 can be omitted and the rich oil from absorber 11 passed directly to still 27. However, in modern plants being operated for maximum propane recovery some sort of deethanizing operation is almost always employed and, generally, some sort of a reabsorber operation is also employed.

The pressures and temperatures of the absorption column 11, of the reabsorber column 16, the deethanizer column 20, the absorption medium stripper 27, or the stabilizer 39 are so selected as to obtain the desired results and these can be varied within rather wide limits as will be realized and well known by those skilled in the art.

While residue gas originating from a natural gasoline extraction plant has been described as being enriched for B.t.u. maintenance, it is to be understood that a residue gas from any source can be enriched with high B.t.u. gaseous constituents from a separation zone controlled in accordance with our invention. In like manner, the gas to be enriched need not necessarily be a residue gas nor even a hydrocarbon gas but can be a manufactured gas such as water gas, coal gas, producer gas, or any other type of gas.

As will be evident to those skilled in the art, various modifications of the invention can be made, or followed, in the light of the above disclosure and the appended claims, without departing from the spirit or scope of said disclosure and said claims.

I claim:

1. A method for controlling the heating value of a residue gas comprising largely methane from a hydrocarbon separation system wherein hydrocarbons boiling within the gasoline range and hydrocarbons boiling lower than the gasoline range are separated as products of the system leaving a residual gas as another product of the system, which method comprises: withdrawing a stream of said residual gas; removing, from a point intermediate the ends of a hydrocarbon separation column of said system, a vapor stream richer in normal butane than propane; combining said removed stream with said residual gas stream to form the said residue gas; measuring the heating value of said residue gas; and varying the rate of removal of said vapor stream in accordance with said measurement so as to compensate for variations in the heating value of said residue gas.

2. A method according to claim 1 wherein said vapor stream is withdrawn from a point intermediate the ends of an absorber separation zone.

3. A method according to claim 1 wherein said vapor stream is withdrawn from a point intermediate the ends of a reabsorber separation zone.

4. A method according to claim 1 wherein said vapor stream is withdrawn from a point intermediate the ends of a deethanizer separation zone.

5. A method according to claim 1 wherein said vapor stream is withdrawn from a point intermediate the ends of a distillation separation zone.

6. A method according to claim 1 wherein said vapor stream is withdrawn from a point intermediate the ends of a stabilizer separation zone.

7. A method for producing a residue gas comprising largely methane and having a substantially constant predetermined B.t.u. content and a natural gasoline from a natural gas containing hydrocarbons boiling within the gasoline boiling range and hydrocarbons boiling lower than the gasoline boiling range in a hydrocarbon separation system, which method comprises: contacting a stream of said natural gas in an absorber separation zone with a lean absorption oil to produce a rich oil and a first residual gas stream; passing said rich oil to a reabsorber separation zone; flash vaporizing lower boiling absorbed hydrocarbons from said rich oil in said reabsorber zone to produce a second residual gas stream and a partially denuded rich oil; passing said partially denuded rich oil to a deethanizing separation zone; deethanizing said partially denuded rich oil in said deethanizing zone to produce a third residual gas stream and a deethanized rich oil; passing said deethanized rich oil to a stripping separation zone; stripping said deethanized rich oil to recover a raw gasoline and lean absorption oil; stabilizing said raw gasoline in a stibilizer separation zone to recover a stable natural gasoline and a light hydrocarbon stream comprising $C_3$ and $C_4$ hydrocarbons; combining said residual gas streams; withdrawing a vapor stream richer in normal butane than propane from a point intermediate the ends of one of said separation zones; combining said vapor stream with said combined residual gas stream to form said residue gas; measuring the heating value of said residue gas; and controlling the rate of withdrawal of said vapor stream responsive to said measurement.

8. In a method of treating a hydrocarbon gas mixture containing normal butane, isobutane, propane and lower boiling gases wherein a residue gas comprising largely methane and having a substantially constant predetermined heating value is produced and a raw gasoline is stabilized in a stabilizer zone, the improvement which comprises: enriching said residue gas with a vapor stream withdrawn from a vapor space intermediate the ends of said stabilizer zone where the ratio of normal butane to propane and isobutane is highest; measuring the heating value of said enriched residue gas; and controlling the rate of withdrawal of said vapor stream responsive to variations in said measurement.

9. In a method of treating a hydrocarbon gas mixture containing normal butane, isobutane, propane and lower boiling gases wherein said mixture is contacted with an absorbent in an absorption zone to produce a residue gas comprising largely methane and having a substantially constant predetermined heating value the improvement which comprises: enriching said residue gas with a vapor stream withdrawn from a vapor space in said absorption zone at a point intermediate the ends of said zone where the ratio of normal butane to propane and isobutane is highest; measuring the heating value of said enriched residue gas; and controlling the rate of withdrawal of said vapor stream responsive to variations in said measurement.

References Cited in the file of this patent

UNITED STATES PATENTS

| | | |
|---|---|---|
| 2,182,536 | Eaton | Dec. 5, 1939 |
| 2,377,736 | White | June 5, 1946 |
| 2,547,970 | Phillips et al. | Apr. 10, 1951 |
| 2,564,791 | Ribble | Aug. 21, 1951 |
| 2,771,149 | Miller et al. | Nov. 20, 1956 |

OTHER REFERENCES

Middlebrook: "Oil and Gas Journal," vol. 49, page 87 (1950).